July 8, 1952 R. F. WILD 2,602,911
SOLENOID ACTUATED SELF-BALANCING MEASURING APPARATUS
Filed June 15, 1950 3 Sheets-Sheet 1

INVENTOR.
RUDOLF F. WILD
BY Arthur H. Swanson
ATTORNEY.

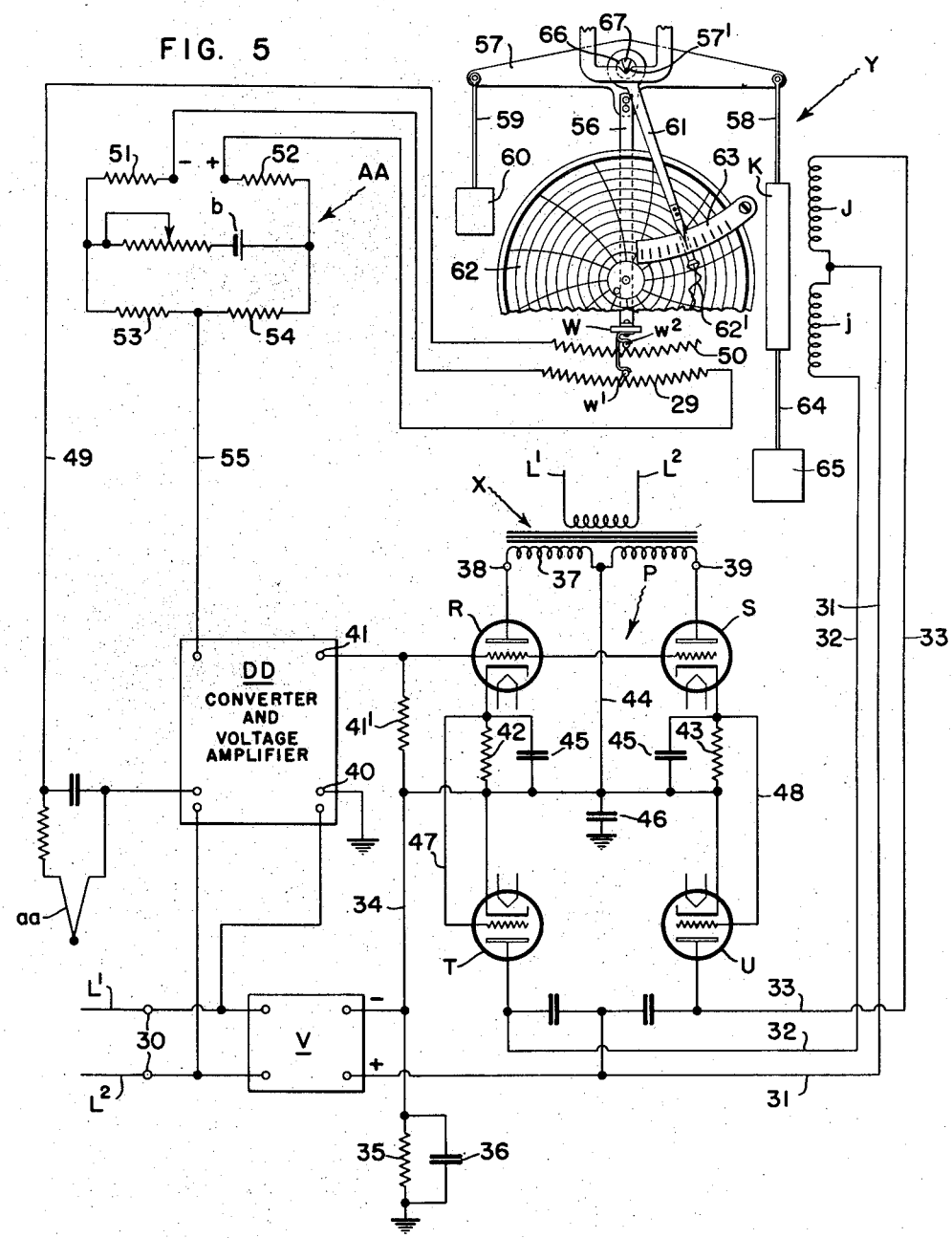

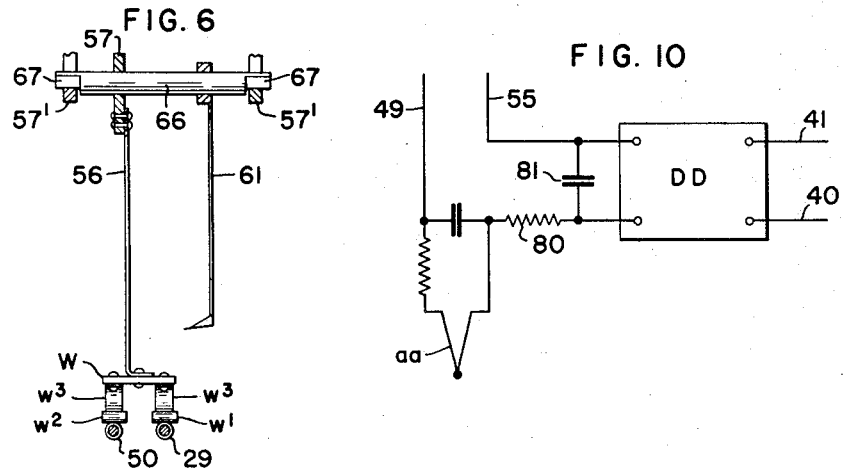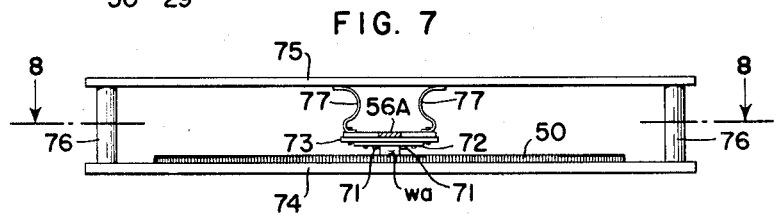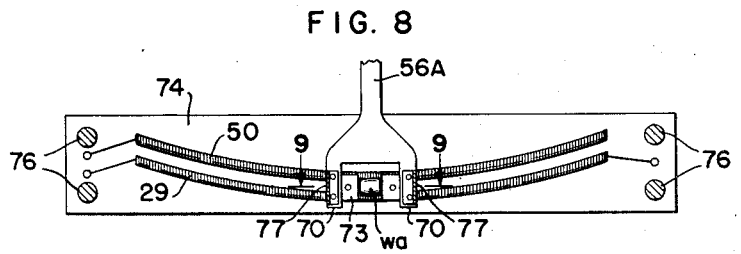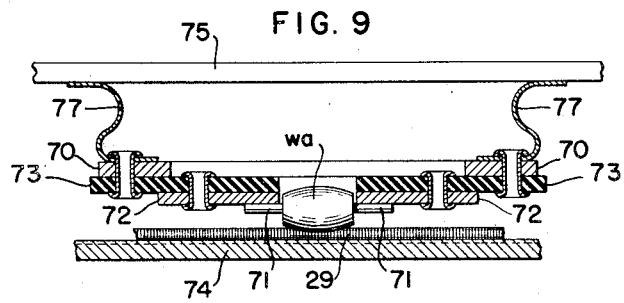
INVENTOR.
RUDOLF F. WILD

Patented July 8, 1952

2,602,911

UNITED STATES PATENT OFFICE 2,602,911

SOLENOID ACTUATED SELF-BALANCING MEASURING APPARATUS

Rudolf F. Wild, Wilmington, Del., assignor to Minneapolis-Honeywell Regulator Company, Minneapolis, Minn., a corporation of Delaware Application June 15, 1950, Serial No. 168,309

9 Claims. (Cl. 318—22)

1

The present invention relates to measuring and control apparatus of the type comprising a measuring circuit network including a bridge or potentiometric circuit which is unbalanced by a change in the value of a thermocouple voltage or other small voltage being measured, or by a change in the resistance of a variable resistor, and which can be rebalanced by the adjustment of a slider contact along a slide wire resistor included in the circuit. Apparatus of the general type described, including a motor rotating in one direction or the other, depending on the direction of unbalance, to effect automatic rebalancing adjustments of the slider contact, has long been in general use. One extensively used form of such apparatus is disclosed and claimed in the Wills Patent 2,423,540 of July 8, 1947.

A broad object of the present invention is to provide apparatus of the general type above mentioned in which the reversible rotatable motor heretofore employed as a rebalancing motor is replaced by a motor of the solenoid type which is associated with simple and effective means for developing and regulating suitable motor energizing currents for effecting slide wire adjustments varying in magnitude and direction with the extent and direction of measuring circuit unbalance. In the preferred form of the invention, the motor comprises a pair of end to end solenoid coils which act in bucking relation and subject a movable solenoid core or plunger to opposing forces which are equal and maintain the core in a neutral position when the measuring circuit is balanced, and which move the core away from said position in one direction or the other when the measuring circuit is unbalanced in one direction or in the opposite direction.

In accordance with the present invention, the small output voltage of the measuring circuit is amplified by an alternating current amplifier, after being first converted into an alternating current signal if initially a unidirectional voltage, and means are provided for deriving two control signals from the amplified alternating current signal. Said control signals respectively control the energization of two solenoid motor windings, which act in bucking relation to subject the movable core of the solenoid to the difference of two opposing magnetic forces. Those forces are automatically varied so that when the measuring circuit is unbalanced, one or the other of the forces will predominate and cause the solenoid core to move in the direction required to rebalance the circuit.

2

The two solenoid windings are preferably arranged in end to end relation, and they, and the solenoid core which they surround, are elongated so that the position of the core does not significantly influence the magnetic pull thereon as the core moves through its normal range of movement. In consequence, when the measuring circuit is unbalanced, the resultant change in the relative magnitudes of the solenoid winding currents, even though small, effects a measuring circuit rebalancing movement of the solenoid core which ordinarily continues until the measuring circuit is rebalanced and the solenoid winding currents are equalized. Thus, the extent of each rebalancing movement of the core normally corresponds to the extent of slide wire adjustment needed to rebalance the circuit, and is normally independent of the actual position of the solenoid core at the beginning or end of the rebalancing operation.

A more specific object of the invention is to provide a solenoid motor control network including a phase discriminating mechanism used for deriving the two opposing control signals through which the movement of the solenoid motor core is regulated.

In one form of the invention, a phase shifting mechanism is used for producing two alternating current signals having phases displaced approximately 90° in opposite directions from the phase of the alternating current used in energizing the solenoid motor. In this form of the invention, there are included means associated with each of the bucking solenoid coils or windings to form a separate motor energizing circuit which includes that coil and is series resonant and operates to increase the current flow through said coil to a maximum value when the measuring circuit is unbalanced in one direction, and which is a parallel resonant circuit of high impedance operating to decrease the current flow through the coil to a minimum when the measuring circuit is unbalanced in the opposite direction. During any periods in which the energizing circuit including one coil is series resonant or is parallel resonant, the circuit including the other coil is respectively parallel resonant or series resonant. To vary in this manner the operation of the two energizing circuits respectively including the two solenoid motor coils or windings, a reactance tube is included in each such energizing circuit in parallel with a capacitor, and means are associated with each reactance tube to impress on the control grid of said tube an alternating current signal which leads or lags the anode voltage of the tube and causes the tube to act as a capacitor to increase the current through the associated coil to a maximum when the measuring circuit unbalance is in one direction, and causes the tube to act as an inductance to reduce the current through the coil to a minimum when the unbalance is in the opposite direction. The last mentioned form of the invention possesses the advantage that under the condition in which the maximum coil current is developed, only a fraction of that current passes through the associated tube.

In a second form of the invention, the phase discriminating mechanism comprises a phase sensitive rectifier of known type for creating two opposing unidirectional signals which are of the same magnitude when the measuring circuit is balanced, and one of which is increased and the other of which is reduced or eliminated when the measuring circuit is unbalanced. The two last mentioned signals are impressed on the control grids of two corresponding electronic valves, one individual to each of the two solenoid winding currents, and thereby control the currents flowing in the respective windings.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a circuit diagram illustrating diagrammatically a preferred embodiment of the present invention;

Figs. 2, 3, and 4 are circuit diagrams illustrating different circuits, each of which is equivalent to a portion of the actual circuit shown in the Fig. 1 under one of three different operating conditions;

Fig. 5 is a circuit diagram illustrating an embodiment of the invention, alternative in form to that shown in Fig. 1, and also illustrating certain features of construction which may be employed in the apparatus shown in Fig. 1;

Fig. 6 is a transverse section through a portion of the apparatus shown in Fig. 5;

Fig. 7 is an elevation of contact mechanism alternative to that shown in Figs. 5 and 6;

Fig. 8 is a plan section taken on the line 8—8 of Fig. 7;

Fig. 9 is a partial section on the line 9—9 of Fig. 8; and

Fig. 10 is a diagram illustrating means which may be used to minimize frictional resistance to relative movement of the slider and slider contact in the apparatus of the present invention.

Figure 1:
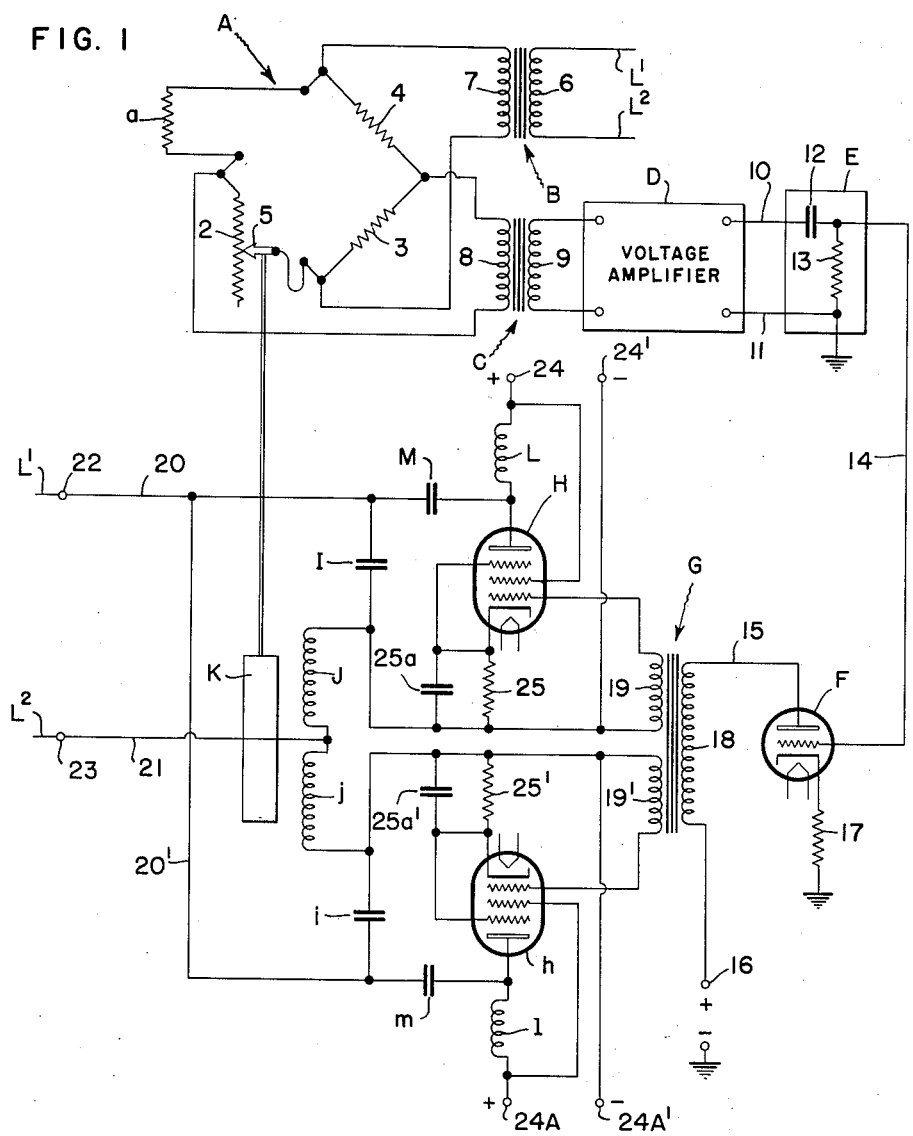

In the embodiment of the invention shown by way of example in Fig. 1, A represents a resistance measuring bridge having four arms. One of the bridge arms includes a resistance thermometer bulb or resistor $a$, the resistance value of which varies in a predetermined manner in accordance with variations in the temperature to which the bulb is exposed. An adjacent bridge arm, which may be called the measuring arm of the bridge, includes an adjustable slide wire resistor 2 having a cooperating slider contact 5. The other two bridge arms include fixed resistors 3 and 4 and are respectively opposite the bridge arms including the resistors $a$ and 2, thus forming the so-called ratio arms of the bridge. As a matter of convenience, each of the four arms of the bridge A will ordinarily be referred to hereinafter by the reference number applied to the resistor included in that arm. For example, the bridge arms respectively including the resistance thermometer $a$ and the adjustable resistor 2 will be referred to as the bridge arms $a$ and 2, respectively, and the ratio arms including the resistors 3 and 4 will be referred to as bridge arms 3 and 4, respectively.

The bridge A is energized by alternating current supplied by a transformer B having the terminals of its primary winding 6 arranged for connection to supply conductors L' and L² which supply alternating current of suitable frequency, which may well be 60 cycles per second. The secondary winding 7 of the transformer B has one terminal connected to the junction of arms $a$ and 4 of the bridge A, and has its other terminal connected to the junction of the bridge arms 2 and 3. When the bridge A is unbalanced, a bridge output signal is transmitted to a voltage amplifier D by a transformer C. The latter has one terminal of its primary winding 8 connected to the junction of the bridge arms $a$ and 2, and has its other terminal connected to the junction of the bridge arms 3 and 4. The terminals of the secondary winding 9 of the transformer C are connected to the input terminals of the voltage amplifier D. One output terminal 10 of the voltage amplifier D is connected to ground through a phase shifter circuit E which serves a purpose hereinafter described and is shown as comprising a condenser 12 having one terminal connected to the amplifier terminal 10 and having its other terminal connected through a resistor 13 to ground. The second terminal 11 of the amplifier D is directly connected to ground.

The potential of the connected terminals of the condenser 12 and resistor 13 is transmitted to the control grid of a triode amplifying valve F through which the adjustment of the slider contact 5 is directly controlled. As shown, unidirectional plate voltage is supplied to the valve F through a conductor 15 connected at one end to the anode of the valve F and having its other end connected to a terminal 16 which in turn is adapted to be connected to a source of potential which is positive relative to ground potential. The cathode of the valve F is connected to ground through a cathode resistor 17.

The valve F controls the adjustment of the slider contact 5 through a transformer G having its primary winding 18 included in the conductor 15. The transformer G has two secondary windings 19 and 19'. The secondary winding 19 supplies bias voltage to a reactance tube H connected in parallel with a condenser I which in turn is connected in series with a solenoid motor coil J between alternating current supply conductors 20 and 21. The conductors 20 and 21 have terminals 22 and 23, respectively, for connection to a suitable source of alternating current, which ordinarily is the same source supplying energizing current to the primary winding 6 of the transformer B. The coil J is connected in end to end relation with a second solenoid motor coil $j$. The latter has one terminal connected to the conductor 21, and has its second terminal connected through a condenser $i$ to a branch 20' of the conductor 20.

The previously mentioned transformer winding 19' provides bias voltage for a second reactance tube $h$. The latter is connected in parallel with the condenser $i$ which in turn is connected in series with the coil $j$ between the conductors 20' and 21. The secondary windings 19 and 19' are so arranged that the bias voltage supplied by the winding 19 to the reactance tube H is 180° out of phase with the bias voltage supplied by the winding 19' to the reactance tube $h$.

Variations in the currents flowing through the windings J and $j$ relative to one another give up and down movements to a magnetic plunger or solenoid core K, diagrammatically shown as having a stem portion directly connected to the slider contact 5. The reactance tube H is supplied with anode voltage from a pair of energizing terminals 24 and 24' which are adapted to be connected to a suitable source of direct current, not shown. The positive terminal 24 is connected to the anode of the valve H through an inductance L. The anode of the valve H is also connected to the conductor 20 through a blocking condenser M. The cathode of the valve H is connected through a bias resistor 25 to a terminal of the winding 19 which is also connected to the negative energizing terminal 24'. A by-pass condenser 25a is connected in parallel with the resistor 25.

The anode of the reactance tube $h$ is connected through an inductance $l$ to a positive energizing terminal 24A which is associated with a negative energizing terminal 24A'. The terminals 24A and 24A' are adapted to be connected to a suitable source of direct current, not shown. The anode of the tube $h$ is also connected to the branch 20' of the conductor 20 through a blocking condenser $m$. The cathode of the valve $h$ is connected through a bias resistor 25', to a terminal of the winding 19' which is also connected to the negative energizing terminal 24A'. As shown, the reactance tubes or valves H and $h$ are similar pentodes, each having a suppressor grid connected to the cathode of the valve, and each having a screen grid connected to the anode of the valve through the corresponding inductance L or $l$.

In the operation of the apparatus shown in Fig. 1, the solenoid core K is normally maintained in the position in which the contact 5 is in the position along the slide wire 2 required to maintain the bridge junctions connected to the terminals of the secondary winding 8 of the transformer C at the same potential. Any change in the temperature to which the resistance bulb $a$ is subjected will unbalance the bridge and create a potential difference between the bridge junctions connected to the winding 8. The resultant current flow through the winding 8 operates through the secondary winding 9 to impress an alternating current signal on the voltage amplifier D which is of a magnitude proportional to the extent of unbalance and is of one phase or the opposite phase accordingly as the bridge A has been unbalanced by an increase or a decrease in the voltage drop across the resistor $a$. The signal thus impressed on the input circuit of the amplifier D, and amplified by the latter, is transmitted through the phase shifter E to the input circuit of the valve F which further amplifies the signal received from the phase shifter E.

Figure 2:
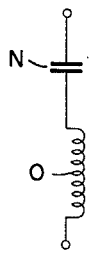
Figure 3:
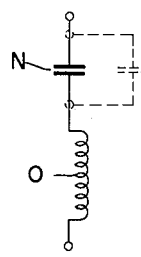
Figure 4:
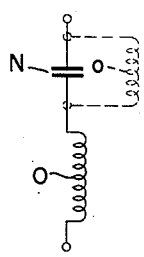

The amplified output signal of the valve F operates through the transformer G to apply separate control voltages to the control grids of the reactance tubes H and $h$. These control voltages are 90° out of phase with the anode voltages of the tubes H and $h$ due to the action of the phase shifter E, one of the control voltages leading one of the anode voltages and the other control voltage lagging the other anode voltage. When the apparatus is balanced, and no control voltage is applied to the control grids of the valves H and $h$, the arrangement of the coil J, condenser I and reactance tube H, and the arrangement of the coil $j$, condenser $i$ and reactance tube $h$, can each be represented by the equivalent circuit shown in Fig. 2 and comprising a capacitance N and an inductance O. When the bridge is unbalanced, however, the operation of each of these arrangements is modified. One of the modified arrangements can be represented by the equivalent circuit shown in Fig. 3, and the other arrangement can be represented by the equivalent circuit shown in Fig. 4. In the arrangement represented by the equivalent circuit of Fig. 3, the control voltage leads the anode voltage of the corresponding reactance tube, and the latter then acts as a capacitance, represented in Fig. 3 by the capacitance $n$, and shown in dotted lines as connected in parallel with the capacitance N. In the arrangement represented in Fig. 4, the control voltage lags the anode voltage of the corresponding reactance tube and the latter acts as an inductance, represented in Fig. 4 by the inductance $o$, and shown in dotted lines as connected in parallel with the capacitance N. In any given operating condition in which the arrangements are modified as described, which of the reactance tubes H or $h$ will act as a capacitance and which as an inductance depends, of course, upon the direction of unbalance of the bridge A.

The impedances of the coil J, condenser I, and reactance tube H are so related to one another and to the frequency of the current supplied by the conductors 20 and 21 that the motor energizing circuit including the circuit elements J, I and H is not resonant when the measuring circuit is balanced, but becomes resonant when the measuring circuit is unbalanced and a signal is impressed on the control grid of the valve H. When the phase relation of the control grid signal and the anode voltage of the valve H is such as to make the tube H act as a capacitance, the motor energizing circuit becomes series resonant. When said phase relation is such that the valve H acts as an inductance, the motor energizing circuit including the coil J, condenser I, and tube H becomes a high impedance parallel resonant circuit.

When the circuit including the circuit elements J, I, and H becomes series resonant, the current flow through the coil J attains its maximum value, and only a fraction of that current flows through the tube H. The magnitude of the maximum current then flowing through the coil J depends upon the ratio of the inductive reactance to the resistance of the coil, and hence upon the Q of the coil. For the series resonant condition of the motor energizing circuit and a coil J with a Q equal to five, the current through the coil J is about five times as great as the current through said coil when the measuring circuit is balanced. Further, only about half of the current flowing through the coil J then passes through the tube H. When the motor energizing circuit including the elements J, I and H becomes parallel resonant, the high impedance of the circuit makes the current flow through the coil J suitably smaller than the current flowing through the coil in the normal or balanced condition of the measuring circuit.

As will be apparent, the control grid and anode voltage relations of the reactance tubes H and h are such as to make the motor energizing circuit including the circuit elements i, j, and h series resonant or parallel resonant when the circuit including the elements J, I, and H is respectively parallel resonant or series resonant. In consequence, when the current flow through either of the coils J or j attains its maximum value, the current through the other coil is reduced to a minimum.

The control of the current flowing through the solenoid coils J and j can be controlled by phase discriminating means quite different from that shown in Fig. 1, and in Fig. 5 I have illustrated an embodiment of the invention in which the current flowing through the coils is controlled by a phase sensitive rectifier P comprising electronic triode valves R and S and associated triode valves T and U. The apparatus shown in Fig. 5 is adapted to measure the varying voltage of a thermocouple $aa$ by means including a conventional potentiometric bridge circuit AA energized by unidirectional current supplied as shown by a battery $b$. When the bridge circuit AA is unbalanced as a result of a change in the thermocouple voltage, the unidirectional current flow through the circuit including bridge AA and the thermocouple $aa$ is converted into alternating current and is amplified by apparatus DD which may be identical with the converter and the first three amplifier stages of the apparatus disclosed in said Wills patent.

The output circuit of the apparatus DD impresses an alternating control signal, varying in magnitude and phase with the magnitude and direction of unbalance of the measuring circuit AA, on the control grids of valves R and S which control the energizing currents flowing through the coils J and j of Fig. 5. The reciprocating movements given the armature K of the solenoid motor, as the currents through the coils J and j are varied, effect adjustments of a slider contact device W along a slide wire resistance 29 to include more or less of the resistance 29 in the measuring circuit branch including the thermocouple $aa$ as required to rebalance the measuring circuit when said circuit is unbalanced by a variation in the voltage of the thermocouple $aa$.

In the arrangement shown in Fig. 5, the currents flowing through the coils J and j are supplied by a source of unidirectional voltage V. The latter may well include a full wave rectifier which is energized by alternating current supplied to the rectifier by the connection of its input terminals 30 to supply conductors L' and L². The rectified output current of the device V energizes the coils J and j through circuit connections including conductors 31, 32 and 33, the anodes and cathodes of the valves T and U, and a conductor 34. The conductor 31 connects the positive output terminal of the device V to the connected end terminals of the coils J and j. The second terminal of the coil j is connected by the conductor 32 to the anode of the valve T. The conductor 33 connects the second terminal of the coil J to the anode of the valve U. The conductor 34 connects the cathodes of the valves T and U to the negative output terminal of the device V. The conductor 34 is connected to ground by a resistor 35 and a condenser 36 connected in parallel with resistor 35.

The valves R and S are supplied with anode current by means shown as comprising a transformer X having its primary winding terminals connected to alternating current supply conductors L' and L². The latter may be connected to any available source of alternating current of suitable frequency, which usually is 60 cycles per second. The secondary winding 37 of the transformer X has one end terminal 38 connected to the anode of the valve R, and has its other end terminal 39 connected to the anode of the valve S. In consequence, the voltage impressed on the anode of each of the valves R and S is 180° out of phase with the voltage impressed on the anode of the other valve. The output terminal 40 of the converter and amplifier DD is connected to ground, and its output terminal 41 is connected to the control grids of the valves R and S. The terminal 41 is connected to the conductor 34 by a resistor 41'. The cathodes of the valves R and S are connected to the conductor 34 through cathode resistors 42 and 43, respectively. Each of the cathode resistors 42 and 43 is connected in parallel with a corresponding condenser 45. The conductor 34 is connected to the mid-point of the transformer secondary winding 37 by a center-tap conductor 44. The cathodes of the valves T and U are directly connected to the conductor 34. The control grid of the valve T is directly connected to the cathode of the valve R by a conductor 47; and the control grid of the valve U is directly connected to the cathode of the valve S by a conductor 48.

One terminal of the thermocouple $aa$ is connected directly to one of the input terminals of the apparatus DD. The other terminal of the thermocouple is connected to the second input terminal of the apparatus by means comprising a conductor 49, the bridge AA, and a conductor 55. As shown, the conductor 49 directly connects the thermocouple $aa$ to one end of a collector bar 50 which is adjacent the slide wire resistor 29. The contact device W is adjustable longitudinally of the elements 29 and 50 and comprises a contact element $w'$ continuously engaging the resistor 29 and a contact element $w^2$ in continuous engagement with the collector bar 50. The contacts $w'$ and $w^2$ are each connected to the body portion of the device W by an individual spring arm $W^3$, as shown in Fig. 6, and are connected to one another and form a bridging conductor connecting the collector bar 50 and the resistor 29 at points along their respective lengths which are varied by the adjustment of the contact device W. The resistor 29 is connected between and in series with resistors 51 and 52 to form one branch of the bridge circuit AA. That branch is connected in parallel with a branch including resistors 53 and 54. Each of said two branches of the circuit AA is connected in parallel with the bridge energizing battery $b$. The connected ends of the resistors 53 and 54 are connected by the conductor 55 to the second input terminal of the converter and voltage amplifier DD. The thermocouple $aa$ is thus connected across the input terminals of the device DD in series with parallel portions of the bridge circuit AA. One of said bridge circuit portions comprises the resistor 53, the resistor 51, and the portion of the resistor 29 at the left of the contact $w'$ as seen in Fig. 5. The other of said bridge circuit portions includes the resistor 54, the resistor 52, and the portion of the resistor 29 at the right of the contact $w'$ as seen in Fig. 5.

The contact device W is carried by the arm 56 of a lever or beam 57 having one portion connected by a link 58 to the armature K of the solenoid motor and having an opposing portion connected by a link 59 to a counter-weight 60. As shown, a pen arm 61 is connected to the lever 57 and is adapted to trace a record 62' of the varying value of the voltage of the thermocouple aa on a movable record chart 62. As shown, the pen arm 61 may serve as an indicating pointer co-operating with a suitable instrument scale 63 to indicate the instantaneous value of the thermocouple voltage. Also as shown, the scale 63 comprises marks, transverse to the arc of movement of the pen point, which are formed generally in conjunction with the scale marks on the record chart 62.

To prevent over-travel of the solenoid motor armature K in response to changes in the relative values of the currents flowing through the coils J and j, the armature K is connected by a link 64 to the moving element of a dashpot 65.

In the normal condition of the apparatus shown in Fig. 5, the potential difference between the conductor 55 and the contact w' is equal and opposite to the potential difference between the terminals of the thermocouple aa. An increase in the thermocouple voltage will then unbalance the bridge circuit with the result that current will flow from one terminal of the thermocouple through the bridge AA, conductor 55, and the input circuit of the apparatus DD to the other terminal of the thermocouple.

The current flow through the input circuit of the apparatus DD, produced as just described by an increase in the thermocouple voltage, results in a change in the output voltage of the apparatus DD which increases the conductivity of the valve S and decreases the conductivity of the valve R. The resultant increase in the potential drop across the cathode resistor 43 of the valve S will increase the conductivity of the valve U without correspondingly increasing the conductivity of the valve T. The resultant increase in the current flow through the valve U and the winding J relative to the current flow through the winding j, causes an upward movement of the armature K and a movement of the beam 57 in the counter-clockwise direction relative to the fulcrum supporting members 57' to be described. The resultant movement in the counter-clockwise direction of the device W decreases the portion of the resistor 29 between the contact w' and the positive terminal of the battery b, and thus increases the bridge circuit voltage opposing the thermocouple voltage as required to rebalance the bridge circuit.

Conversely, on a decrease in the thermocouple voltage, the phase of the output signal of the conversion amplifier DD is such as to increase the conductivity of the valve R and decrease the conductivity of the valve S. The resultant increase in the conductivity of the valve T, relative to the conductivity of the valve U, increases the current flow through the coil j relative to the current flow through the coil J, and thereby produces a clockwise adjustment of the beam 57 as required to compensate for the decrease in the thermocouple voltage and rebalance the bridge circuit. Thus, in Fig. 5, as in Fig. 1, each rebalancing movement of the solenoid armature K is the direct result of a control action of a phase discriminating means in selective response to the phase of the amplified signal in the output circuit of an alternating current amplifier.

As collectively shown in Figs. 5 and 6, a horizontal axle or pivot element 66 extends transversely through and is secured to the beam 57. At its ends, the member 66 is provided with trunnions 67 with knife edges at their undersides which engage the bearing surfaces of the fulcrum supporting members 57'. In some cases, at least, it may be desirable to provide special means for constantly maintaining a desirable contact pressure between the bridging contact elements and the elements 29 and 50. Thus, in the arrangement shown in Figs. 5 and 6, the weight of the beam 57 and attached parts, including the armature core K and counter-weight 60, acts through the springs $w^3$ to maintain adequate contact pressure between each of the contacts w' and $w^2$ and the associated elements 29 and 50.

Figs. 7, 8, and 9 illustrate a contact arrangement adapted for use in lieu of the arrangement shown in Figs. 5 and 6, and comprising an arm 56A which may be mounted and oscillated in the same general manner as the arm 56 of Figs. 5 and 6. The free end of the arm 56A is bifurcated, and its bifurcations 70 are spaced apart to provide a receiving space for a bridging contact member wa. The latter, as shown, is of barrel shape and is connected to and supported by the bifurcations 70 with some freedom for self-adjustment to maintain contact with each of the elements 29 and 50. As shown in Fig. 9, the contact wa is connected through trunnion-like supporting elements 71 to a metal plate 72. The latter is secured by rivets or such means to the underside of a block 73 of insulating material, such as Bakelite, which underlies and is secured to the bifurcations 70. In the arrangement shown in Figs. 7, 8, and 9, the elements 29 and 50, which are curved about the axis of oscillation of the arm 56A, are mounted on a stationary block of insulating material 74 which may also be of Bakelite. A metal plate 75, above and parallel to the plate 74, is rigidly connected to the latter by posts 76. The plate 75 is spaced away from the plate 74 and has its underside engaged by spring 77 in the form of curved blades having their lower ends rigidly attached to the bifurcations 70.

In the normal operation of the arrangement shown in Figs. 7, 8, and 9, the springs 77 are compressed to hold the contact wa against each of the elements 29 and 50. The arrangement shown in Figs. 7, 8, and 9 is operative to maintain a suitable contact pressure between the contact part wa and each of the elements 29 and 50, even though the arm 56A is relatively long and slender and flexible, so that if not restrained it might bend at times and move its free end away from the elements 29 and 50. The arm 56A needs to have considerable length since, in practice, the angle of oscillation of the associated pen arm 61 is desirably small: for example, 25°.

To reduce the effective frictional resistance to the movement of the contact arm 56 of Fig. 5, or of the contact arm 56A of Figs. 7 to 9, means for creating a tapping action may be provided. For example, as shown in Fig. 10, a resistor 80 may be inserted in the connection between the terminal of the thermocouple aa and the corresponding input terminal of the conversion amplifier DD, and one end of the resistor 80 may be connected to the conductor 55 by a condenser 81. The latter is made to have such an impedance value relative to the resistance of the resistor 80 that the time constant of the connected elements 80 and 81 will be large enough to produce an oscillation of the motor drive system of about 0.1% amplitude. The resultant vibration of the armature K is effective to overcome the starting friction of the apparatus. For the described tapping action, the resistance of the resistor 80 may well be approximately 150 ohms, and the capacity of the condenser 81 may be approximately 500 microfarads. In practice, the values of the elements 80 and 81 may be modified as the inertia of the movable apparatus elements and the characteristic of the dashpot 65 may require to obtain the optimum magnitude of tapping action. As will be apparent, the special features pertaining to the adjustment of the slider contact and the contact pressure between the slider contact and associated elements illustrated in Figs. 5 to 10 can be used with the circuit arrangement shown in Fig. 1 as well as the arrangement shown in Fig. 5.

While, in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In self-balancing measuring and control apparatus including a normally balanced measuring circuit adapted to be unbalanced by a change in a controlling condition, means including an electronic alternating current amplifier having an output circuit and operative on the occurrence of unbalance in said measuring circuit to develop and amplify an alternating current signal of a predetermined frequency and of a phase depending on the direction of circuit unbalance, and an adjustable rebalancing device operative to rebalance said measuring circuit by its adjustment in one or another of two predetermined directions dependent upon the direction of unbalance, the improved rebalancing apparatus comprising a solenoid motor including a movable armature, means connecting said armature to said rebalancing device to adjust the latter in a direction selectively dependent upon the direction of movement of said armature, two motor windings each operative when energized to subject said armature to a force tending to move said armature in a predetermined direction opposite to that in which the other of said windings tends to move said armature, a separate electronic valve associated with each of said windings and having an anode, a cathode, and a control grid, means for connecting each of said windings and a separate condenser in an individual series circuit, means for connecting each of said series circuits across a source of alternating current, means for connecting the anode and cathode of each of said valves in series with a separate condenser across the condenser included in the series circuit including the corresponding one of said windings, means for connecting the anode and cathode of each of said valves across a source of direct current, and mechanism including phase discriminator means connected to the output circuit of said amplifier and selectively responsive to the phase of the amplified signal and operative to impress signals on the control grids of said two valves making one valve more or less conductive than the other, dependent on the phase of said amplified signal, to effect thereby the adjustment of said device in the direction to rebalance said measuring circuit.

2. Improved rebalancing apparatus as specified in claim 1, in which the electronic valve associated with each of said motor windings is a reactance tube, in which the current supplied by said source of alternating current is alternating current similar in phase to said amplified signal when said measuring circuit is unbalanced in a predetermined direction, and in which said mechanism comprises phase shifting means cooperating with said phase discriminator means and operative to shift the phase of said amplified signal 90° and to transmit a signal proportional in magnitude to said phase shifted signal and of the same phase as the latter to the control grid of one of said reactance tubes and to transmit to the control grid of the other of said reactance tubes a signal proportional in magnitude to said phase shifted signal, but opposite in phase to the latter, whereby each of said reactance tubes is adapted to act as an inductance or as a capacitance accordingly as said amplified signal is of one phase or of the opposite phase, and whereby when one of said tubes acts as an inductance or a capacitance, the other of said tubes operates as a capacitance or an inductance, respectively.

3. Improved rebalancing apparatus as specified in claim 1, including a phase sensitive rectifier comprising two electronic valves, each having an anode, a cathode, and a control grid, and including means for connecting the anode of each of the last mentioned valves to a source of alternating current opposite in phase to the source of alternating current to which the anode of the other of said last mentioned valves is connected, in which the control grids of said last mentioned valves are connected in the output circuit of said amplifier so that unbalance of said measuring circuit in one direction or the other makes one or the other of said last mentioned valves more conductive than the other, and in which said last mentioned valves respectively impress signals on the control grids of the two valves associated with said motor windings.

4. The combination with two coacting motor energizing windings and a separate condenser associated with each winding, of means for selectively energizing said windings comprising means for connecting each winding to a source of alternating current in series with the associated one of said condensers and in parallel with the other of said windings and its associated condenser, a separate reactance tube associated with each of said condensers and comprising an anode, a cathode, and a control grid, each of said tubes having its anode and cathode connected in series between the terminals of the associated one of said condensers and having an input circuit including said cathode and said control grid, a separate control device included in each of said input circuits, and means operatively connected to each of said devices for impressing an alternating current control signal of regulable magnitude on the corresponding one of said input circuits which is of the same frequency as the current from said source and which is of a phase displaced approximately 90° from the phase of the current from said source and displaced approximately 180° from the signal impressed on the other of said input circuits.

5. The combination with first and second control windings and a separate condenser associated with each winding, of means for selectively energizing said windings comprising means for connecting each of said windings to a source of alternating current in series with the associated one of said condensers and in parallel with the other of said windings and its associated condenser, a separate reactance tube associated with each of said condensers and comprising an anode, a cathode, and a control grid, each of said tubes having its anode and cathode connected in series between the terminals of the associated one of said condensers and having an input circuit including said cathode and said control grid, a transformer comprising a primary winding and two secondary windings, one of said secondary windings being connected in and energizing one of said input circuits and the other of said secondary windings being reversely connected in and energizing the second of said input circuits, and means for selectively energizing said primary winding in accordance with variations in a controlling condition by supplying alternating current thereto respectively of the same frequency as the current from said source and of a phase leading or lagging the phase of the last mentioned current, depending on the direction of variation of said condition.

6. The combination with first and second control windings and a separate condenser associated with each winding, of means for selectively energizing said windings comprising means for connecting each of said windings to a source of alternating current in series with the associated one of said condensers and in parallel with the other winding and its associated condenser, a separate reactance tube associated with each of said condensers and comprising an anode, a cathode, and a control grid, each of said tubes having its anode and cathode connected in series between the terminals of the associated one of said condensers and having an input circuit including said cathode and control grid, and control means responsive to the value of a control condition and comprising means for creating an alternating current control signal of the same frequency as the current supplied by said source, and of the same phase as, or opposite in phase to, the last mentioned current, depending on the value of said condition, phase shifting means for shifting the phase of said signal approximately 90 degrees, and means controlled by said phase shifted signal and operative to impress a signal on one of said input circuits which is in phase with said phase shifted signal, and operative to impress a signal on the other of said input circuits which is 180° out of phase with said phase shifted signal.

7. The combination with alternating current supply conductors, of two resonant circuit units for producing opposing motor energizing forces, each of said units comprising a motor energizing winding, a condenser, and a reactance tube having an anode, a cathode and a control grid, the said winding and condenser of each of said units being connected in series between said supply conductors, and the reactance tube of each of said units having its anode directly connected to the supply conductor which is directly connected to the condenser of that unit and having its cathode connected to the other of said supply conductors through the winding of that unit, and a control mechanism operative to impress a control signal on the control grid of one of said tubes which is opposite in phase to the signal simultaneously impressed on the control grid of the other of said tubes, and including means selectively operable to cause the phase of the signal impressed on one of said control grids to lead or lag the anode current supplied to the corresponding one of said tubes by said supply conductors while causing the phase of the signal impressed on the other of said control grids to respectively lag or lead the anode current supplied to the corresponding one of said tubes by said supply conductors, and thereby to increase the motor driving force of the one of said units including the tube in which the impressed signal leads the corresponding anode current while simultaneously decreasing the motor driving force of the other of said units.

8. A combination as specified in claim 7, in which said control mechanism comprises a transformer having a primary winding and two secondary windings, one associated with each of said units and each having one terminal connected to the control grid, and a second terminal connected to the cathode, of the reactance tube included in the respective unit, the connections between said secondary windings and said tubes being arranged to make the phase of the signal applied to the control grid-cathode circuit of one of said tubes opposite to the phase of the signal applied to the control grid-cathode circuit of the other of said tubes.

9. A combination as specified in claim 8, comprising measuring apparatus of known type operative to develop an alternating current signal proportional in magnitude to changes in the value of a quantity measured and of a phase which is the same as, or which is opposite to, the phase of the current supplied by said supply conductors to the anodes of said reactance tubes, and comprising a phase shifter connected to said measuring apparatus and to said primary winding, and operative to effect a 90° shift in the phase of the signal developed by said measuring apparatus and to transmit the phase shifted signal to said primary winding.

RUDOLF F. WILD.

REFERENCES CITED

The following references are of record in the file of this patent:

Electronics, December, 1943, pages 106–111, 192 and 194; "Strain Gages," by D. M. Nielsen.